United States Patent
Jiang et al.

(10) Patent No.: US 6,445,752 B1
(45) Date of Patent: Sep. 3, 2002

(54) APPARATUS AND METHOD FOR PHASE TRACKING IN A DEMODULATOR

(75) Inventors: Hong Jiang, Montclair; Paul L. Palmieri, New Providence; Agesino Primatic, Jr., Frenchtown; Lesley J. Wu, Parsippany; Liangkai Yu, New Providence, all of NJ (US)

(73) Assignee: Agere Systems Guardian Corp., Miami Lakes, FL (US)

( * ) Notice: Subject to any disclaimer, the term of this patent is extended or adjusted under 35 U.S.C. 154(b) by 0 days.

(21) Appl. No.: 09/248,904

(22) Filed: Feb. 12, 1999

(51) Int. Cl.$^7$ ................................. H04L 27/14
(52) U.S. Cl. ...................... 375/326; 375/235
(58) Field of Search .................. 375/316, 233, 375/321, 346, 326, 232, 327, 339, 235, 345, 350, 324, 373, 376, 332, 331, 279, 280; 455/201, 202, 203, 204, 208, 242.1, 242.2, 260, 265; 329/346, 313, 304, 306, 357; 348/537, 725, 726, 607

(56) References Cited

U.S. PATENT DOCUMENTS

| | | | |
|---|---|---|---|
| 5,122,879 A | | 6/1992 | Ito |
| 5,533,071 A | * | 7/1996 | Krishnamurthy et al. ... 375/346 |
| 5,546,132 A | | 8/1996 | Kim et al. |
| 5,606,579 A | | 2/1997 | Patel et al. |
| 5,673,293 A | * | 9/1997 | Scarpa et al. ............... 375/321 |
| 5,793,821 A | * | 8/1998 | Norrell et al. .............. 375/355 |
| 5,872,815 A | * | 2/1999 | Strolle et al. ............... 375/321 |
| 6,088,389 A | * | 7/2000 | Larsson ....................... 375/231 |
| 6,115,431 A | * | 9/2000 | Lee .............................. 375/324 |
| 6,133,964 A | * | 10/2000 | Han ............................. 348/726 |
| 6,141,378 A | * | 10/2000 | d'Oreye de Lantremange .. 375/232 |
| 6,178,201 B1 | * | 1/2001 | Hillery ........................ 375/232 |
| 6,259,743 B1 | * | 7/2001 | Garth .......................... 375/222 |

* cited by examiner

Primary Examiner—Jean Corrielus
Assistant Examiner—Emmanuel Bayard
(74) Attorney, Agent, or Firm—Steve Mendelsohn; Ian M. Hughes

(57) ABSTRACT

A phase tracker receives a signal component $x_n$ and forms a phase- and gain-corrected signal $z_n$. In particular, the phase tracker performs a Hilbert transform of $x_n$ to produce a quadrature phase component $y_n$ to form the constellation defined by ($x_n$, $y_n$). Consequently, phase rotation and gain adjustment are combined into a linear transform of the constellation defined by ($x_n$, $y_n$). The linear transform $z_n = \alpha x_n + \beta y_n$ employs two coefficients $\alpha$ and $\beta$. The coefficients $\alpha$ and $\beta$ of the linear transform are derived so as to provide an optimal solution according to minimum mean square error. Approximations to the coefficients $\alpha$ and $\beta$ of the linear transform may be iteratively determined with a stochastic gradient method. Advantages of employing the phase- and gain-corrected signal $z_n$ as an I-phase detection result of a demodulator include 1) the phase rotation and gain adjustment are combined into one operation, and 2) the a sine/cosine lookup table is not employed. Including both phase rotation and a gain adjustment may provide for better performance of the demodulator. In addition, these advantages may result in reduced circuit complexity and reduced added error.

22 Claims, 2 Drawing Sheets

APPARATUS AND METHOD FOR PHASE TRACKING IN A DEMODULATOR

BACKGROUND OF THE INVENTION

1. Field of the Invention

The present invention relates to phase tracking, and more particularly, to phase tracking for carrier recovery in a demodulator of a telecommunications receiver.

2. Description of the Related Art

Many telecommunications applications require carrier recovery and demodulation by a receiver. One telecommunications application is reception and demodulation of High Definition Television (HDTV) signals, as proposed in the Advanced Television Standards Committee (ATSC) advanced television (ATV) standard. HDTV signals may include vestigial sideband (VSB) component signals representing code symbol levels, and for these HDTV signals the pilot carrier is a waveform having discrete, fixed amplitudes. Each amplitude corresponds to a prescribed percentage of modulation of the carrier, and is desirably the same percentage as that associated with the smallest change in code symbol level. Code symbol levels may typically be 8 or 16. Although such VSB signals may be used, for example, in over-the-air broadcasting of HDTV signals, VSB signals may be used in many other telecommunications applications, such as in cable-casting systems.

Techniques to demodulate the HDTV signals have been proposed, such as those described in ATSC ATV standard document Doc. A/54, "Guide to the Use of the ATSC Digital Television Standard." Proposed radio receivers may employ double-conversion followed by synchronous detection. According to this technique, a frequency synthesizer generates first local oscillations that are heterodyned with the received television signals to generate first intermediate frequencies (e.g., with a 920 MHz carrier). A passive, bandpass filter selects these first intermediate frequencies for amplification by a first intermediate-frequency amplifier. The amplified first intermediate frequencies are then filtered by a first surface-acoustic-wave (SAW) filter that rejects adjacent channel responses. The first intermediate frequencies are heterodyned with second local oscillations to generate second intermediate frequencies (e.g., with a 41-MHz carrier). A second SAW filter selects these second intermediate frequencies for amplification by a second intermediate-frequency amplifier. The response of the second intermediate-frequency amplifier is synchrodyned to baseband with third local oscillations of fixed frequency.

The third local oscillations of fixed frequency are supplied in 0°- and 90°-phasing for the in-phase and quadrature-phase synchronous detection process (I-phase and Q-phase detection). I-phase detection provides the eight-level code symbols of the broadcast HDTV VSB signals as a result. Q-phase detection provides a nominally zero-valued result. However, when digital sampling of the signals is employed, the separate processes of I-phase and Q-phase detection may cause several problems. For example, the I-phase and Q-phase detection results may not necessarily track each other after sampling, and quantization noise may introduce phase errors in the corrected signal (when considered as a phasor).

Separate I-phase and Q-phase detection may be implemented by digitally sampling the output signal of the second intermediate-frequency amplifier at twice the Nyquist rate of the eight-level coding. The successive samples are considered to be consecutively numbered in order of their occurrence. Odd samples and even samples are separated from each other to generate respective ones of the I-phase and Q-phase detection results. The result of the I-phase detection containing the eight-level coding may be filtered to remove co-channel interference from NTSC signals. The result of the I-phase detection is subjected to equalization from an equalization filter before being applied to a trellis decoder. The trellis decoder response is interleaved data provided to a de-interleaver. The de-interleaver supplies the data to a Reed-Solomon decoder.

Synchrodyning may be employed to recover the modulating signal at baseband (baseband extending from zero frequency to the highest frequency in the modulating signal). Synchrodyning for I-phase and Q-phase detection employs the result of Q-phase detection to generate automatic-frequency-and-phase-control (AFPC) signals. A controlled oscillator employs the AFPC signals to adjust the frequency and phase of the second local oscillations. Adjusting the frequency and phase of the second local oscillations reduces the amplitude, and hence, error, of the Q-phase detection result.

This automatic frequency and phase control of the prior art may be inadequate in providing the desired degree of phase stability for I-phase detection. An equalization filter may be used to correct for static phase error of the synchrodyning process by adaptively filtering the result of I-phase detection. However, changing filter coefficients of the equalization filter may occur too slowly to compensate for phase jitter in the AFPC feedback loop or to compensate for the changes in phase error that occur during rapid changes in multipath reception of the HDTV signal.

Accordingly, in HDTV signal radio receivers of the prior art, a phase tracker is cascaded with the equalization filter. The phase tracker of the ATSC ATV standard performs a Hilbert-transform with a finite-impulse-response (FIR) filter (a Hilbert-transform filter, or HTF) and then uses a phase-locked loop (PLL) for phase de-rotation. The equalized result of the I-phase detection is supplied as a digital signal to the Hilbert-transform filter. The response of this Hilbert-transform filter and the equalized result, as delayed to compensate for the latency of the Hilbert-transform FIR filter, are applied as real and imaginary input signals to a complex-number multiplier to generate a complex-number product. These real and imaginary input signals may be defined with coefficients and a unit Euler vector.

A feedback loop ascertains the departure from the zero axis of the imaginary component of the complex-number product to develop an error signal for adjusting the phase angle of the unit Euler vector. The real and imaginary values of the unit Euler vector are drawn from a sine/cosine look-up table (LUT) stored in read-only memory (ROM). The sine/cosine LUT is addressed by the output of an accumulator used for integrating the error signal. However, this phase tracker requires LUT entries to generate an estimate of the phase error, which adds both computational steps and complex circuitry if reasonable accuracy is desired.

In a modified HDTV signal radio receiver, the second local oscillations are heterodyned with the first intermediate frequencies to convert them to second intermediate frequencies, and the second local oscillations are of a fixed frequency. Accordingly, phase jitter of the AFPC feedback loop of a controlled oscillator is eliminated. The second local oscillations are at a fixed frequency offset from the frequency of the carrier for the second intermediate frequencies, and the second local oscillations are heterodyned with the first intermediate frequencies to downconvert them to third intermediate frequencies. The third intermediate frequencies still exhibit changes in multipath reception of the HDTV signal requiring a phase tracker. The phase tracker is implemented before adaptive filtering with an equalization filter, and may be a bandpass phase tracker, rather than a baseband (or lowpass) phase tracker, as described previously. The bandpass phase tracker, however, exhibits similar problems of the baseband phase tracker.

SUMMARY OF THE INVENTION

The present invention relates to phase tracking of a signal component to form a corrected signal by providing a quadrature component from the signal component and applying a linear transform, based on a set of coefficients, to the signal component and the quadrature component. The set of coefficients is generated based on a previous set of coefficients and a previous corrected signal, the set of coefficients being derived in accordance with an optimization criterion. For a preferred embodiment, the optimization criterion is based on the minimum mean square error between the ideal channel signal and the corrected signal. One advantage of the present invention is that the phase tracking not only performs a phase rotation of the constellation, but also performs a gain adjustment. Also, the phase tracking is optimal with respect to an error criterion, such as mean squared error, and the phase tracking does not require use of a sine/cosine lookup table.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Figure 1:
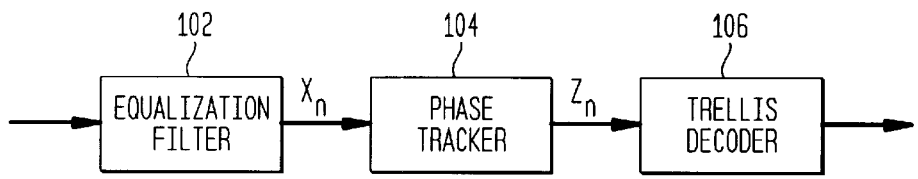
FIG. 1 shows a block diagram of a portion of a demodulator employing a phase tracker in accordance with the present invention.

FIG. 1 shows a block diagram of a portion of a demodulator of a receiver, such as a HDTV radio receiver, employing a phase tracker 104 in accordance with the present invention. The phase tracker 104 receives the signal component $x_n$ from the equalization filter 102, and provides a corrected signal $z_n$. The signal component $x_n$ may be, for example, an equalized I-phase detection result, and the corrected signal $z_n$ may be, for example, a phase- and gain-corrected signal component comprising code symbols for decoding by the trellis decoder 106. The trellis decoder 106 may also include error correction. The subscript "n" indicates that the signal represents a sequence of discrete values, such as digital samples.

The equalization filter 102, which may be a T-spaced filter, provides the signal component $x_n$. However, the signal component $x_n$ includes a phase error and gain error when compared to the originally transmitted signal, defined as the ideal channel, or baseband, signal $v_n$. The ideal channel, or baseband, signal $v_n$ may be the code symbol level represented by a VSB signal.

In accordance with the present invention, phase tracker 104 processes the signal component $x_n$ to form the quadrature component $y_n$. The quadrature component $y_n$ is shifted by 90° with respect to the signal component $x_n$. A constellation defined by $(x_n, y_n)$ represents a vector signal composed of the signal component $x_n$ and quadrature component $y_n$. The corrected signal $z_n$ is generated from a linear transform of the signal component $x_n$ and quadrature component $y_n$. The linear transform is related to rotation and gain adjustment of a vector signal. The linear transformation may be as given in equation (1):

$$z_n = \alpha x_n + \beta y_n, \qquad (1)$$

where $\alpha = g \cos \phi$, $\beta = -g \sin \phi$, $\phi$ is the angle of rotation and g is the gain factor. Phase tracker 104 dynamically determines the coefficients $\alpha$ and $\beta$ of equation (1), and generates $z_n$.

Figure 2:
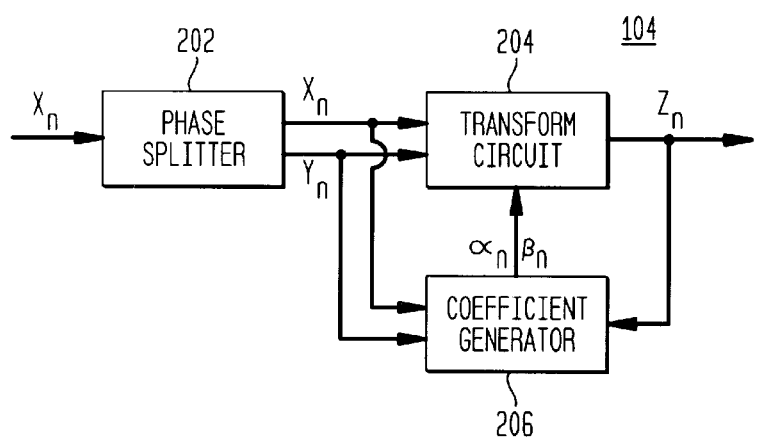
FIG. 2 is a block diagram of an exemplary embodiment of the phase tracker of FIG. 1.

FIG. 2 is a block diagram of an exemplary embodiment of the phase tracker 104 in accordance with the present invention. Phase tracker 104 includes a phase splitter 202, transform circuit 204, and coefficient generator 206. Phase splitter 202 receives the signal component $x_n$ and provides the quadrature component $y_n$, which is shifted by 90° with respect to the input signal component $x_n$. Phase splitter 202 may include both a Hilbert transform filter, to generate the quadrature component $y_n$ from $x_n$, and a delay, to delay the signal component $x_n$ by a predetermined amount of time. The delay may be employed to cause the components $x_n$ and $y_n$ to be provided at a corresponding point in time to account for latency of the Hilbert transform filter.

The components $x_n$ and $y_n$ and the coefficients $\alpha$ and $\beta$ are supplied to the transform circuit 204 which forms the corrected signal $z_n$ as given by equation (1). Consequently, the transform circuit 204 rotates the vector signal of the constellation defined by $(x_n, y_n)$ by an angle of $\phi = \text{atan}(-\beta/\alpha)$ and the gain of the vector signal is adjusted by a factor of $g = \sqrt{\alpha^2 + \beta^2}$. The corrected signal $z_n$ is defined as the real component of the rotated and phase adjusted vector signal of the constellation. The coefficient generator 206 may determine the values for the coefficients $\alpha_n$ and $\beta_n$ based on the previous values for $x_{n-1}$ and $y_{n-1}$ and the coefficients $\alpha_{n-1}$ and $\beta_{n-1}$.

The method of generating the coefficients $\alpha$ and $\beta$ of equation (1) is now described, and these coefficients are derived as being optimized with respect to minimum mean square error (MSE). However, as would be apparent to one skilled in the art, other optimization criteria may be employed in a similar manner to generate values for coefficients $\alpha$ and $\beta$ (e.g., minimized mean square error with weighting or minimized median error).

Figure 3:
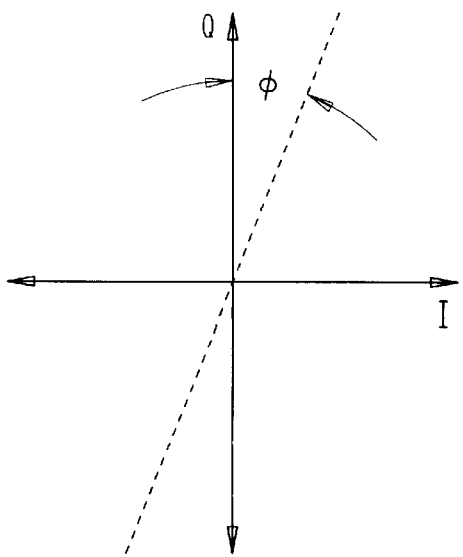
FIG. 3 shows the phase error of a complex valued vector received by the phase tracker.
Figure 4:
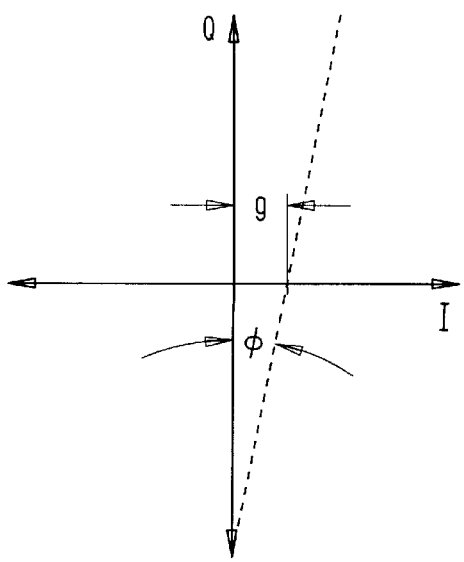
FIG. 4 shows the gain error of a complex valued vector received by the phase tracker.

If received from an ideal channel by the demodulator, the signal component $x_n$ is equivalent to the ideal channel signal $v_n$. For the ideal channel case, the constellation defined by $(x_n, y_n)$, when plotted on a horizontal axis (the real (I) axis) and a vertical axis (the imaginary (Q) axis), respectively, lies on one of a set of vertical lines passing through the real axis. The 8 vertical lines may, for example, correspond to the 8 vestigal sideband (VSB) signals assigned to code symbols of the trellis decoder 106 of FIG. 1. In the presence of phase noise, however, the lines, or vectors, are rotated, and the constellations appear in "bow-tie" shapes. The error introduced by phase noise may be represented as a phase and gain shift of the ideal channel signal $v_n$. FIG. 3 shows a phase error $\phi$ of the complex valued vector received by the phase tracker. FIG. 4 shows a gain error g of the complex valued vector received by the phase tracker, in addition to the phase error.

The coefficients $\alpha$ and $\beta$ in equation (1) are determined adaptively with a decision-based algorithm designed to optimize the performance of the demodulator. The ideal performance of the demodulator is achieved when $z_n$ is equal to one of the real-valued vertical lines ($\beta=0$). This may occur when, for example, $z_n$ is equal to one of the VSB values (i.e., $z_n=v_n$, where $v_n=-7, -5, -3, -1, 1, 3, 5,$ and $7$ for 8 code-symbol VSB signals). The phase tracker 104 desirably generates $z_n$ from equation (1) so that the constellation defined by $(x_n,y_n)$ lies relatively close to one of the vertical lines $z_n=v_n$. Therefore, an error may be defined as the difference between the estimated value $z_n$ and the actual value $v_n$. Given equation (1), this error may be expressed as given in equation (2):

$$z_n - v_n = \alpha x_n + \beta y_n - v_n \quad (2)$$

where $v_n$ is the baseband (e.g., VSB) signal closest to $z_n$.

For the optimized method of the phase tracker 104, the coefficients of equation (1) are preferably computed so as to minimize the mean square error (MSE). Consequently, for MSE, the coefficients $\alpha$ and $\beta$ are desirably selected in accordance with equation (3):

$$\epsilon((\alpha x_n + \beta y_n - v_n)^2) = \min \quad (3)$$

where $\epsilon(\ )$ denotes the expected value and "min" indicates a minimum value of the expected value curve. The coefficients $\alpha$ and $\beta$ that satisfy equation (3) are determined by solving the linear system of equations given by equation (4):

$$\begin{bmatrix} \epsilon(x_n^2) & \epsilon(x_n y_n) \\ \epsilon(x_n y_n) & \epsilon(y_n^2) \end{bmatrix} \begin{bmatrix} \alpha \\ \beta \end{bmatrix} = \begin{bmatrix} \epsilon(x_n v_n) \\ \epsilon(y_n v_n) \end{bmatrix} \quad (4)$$

The solution of the linear system of equations in equation (4) has a unique solution for the exemplary VSB signals because the 2×2 matrix in equation (4) is positive definite and nonsingular. The matrix may be shown to be positive definite with equation (5):

$$[\alpha \beta] \begin{bmatrix} \epsilon(x_n^2) & \epsilon(x_n y_n) \\ \epsilon(x_n y_n) & \epsilon(y_n^2) \end{bmatrix} \begin{bmatrix} \alpha \\ \beta \end{bmatrix} = \epsilon((\alpha x_n + \beta y_n)^2) \geq 0 \quad (5)$$

The equality (=0) in equation (5) is true when $\alpha x_n + \beta y_n = 0$, for all n, i.e., the constellations defined by $(x_n,y_n)$ all lie on a single line, or when both $\alpha$ and $\beta$ are equal to zero. Since the constellations have 8 VSB signals (code symbols), the constellations defined by $(x_n,y_n)$ cannot all lie on one line. Therefore, the equality in equation (5) is true only when both $\alpha$ and $\beta$ are equal to zero, and, therefore, the matrix is positive definite.

Figure 5:
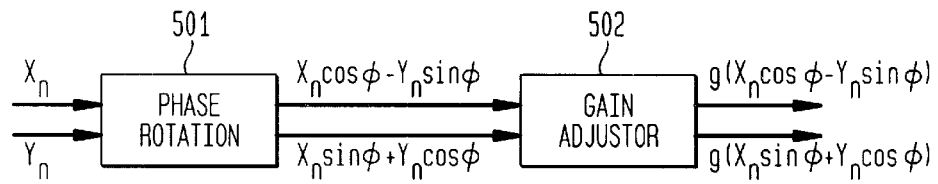
FIG. 5 shows an embodiment of the transform circuit of FIG. 2.

FIG. 5 shows an embodiment of the transform circuit 204 of FIG. 2 generating $z_n$ in accordance with equation (1) with the coefficients $\alpha$ and $\beta$ from coefficient generator 206. The coefficients $\alpha$ and $\beta$ may be determined by either an exact or approximate solution to equation (4). Consequently, the phase rotation circuit 501 rotates the vector signal (of the constellation defined by $(x_n, y_n)$) by an angle of $\phi = \text{atan}(-\beta_n/\alpha_n)$, and the gain adjustor 502 multiples the phase-rotated vector signal by a factor of $$g = \sqrt{\alpha_n^2 + \beta_n^2}.$$

The subscript n for the coefficients $\alpha_n$ and $\beta_n$ indicates that these coefficent values are generated for use with the current vector signal. The value for $z_n$ is the real component of the phase-rotated vector signal; therefore $z_n$ is $$gx_n \cos \phi - gy_n \sin \phi$$

The exact solution of equation (4) may be difficult to determine due to the number of computational steps required. Since the phase tracker in accordance with the present invention adaptively determines the coefficients, an approximation of the solution may be employed that is computationally efficient. The approximation of the solution may be computed using an iterative stochastic gradient (SG) method as follows in equation (6):

$$\alpha_0=1, \beta_0=0,$$
$$\alpha_n = \alpha_{n-1} + \gamma er_{n-1} x_{n-1}, (n>0)$$

and $$\beta_n = \beta_{n-1} + \gamma er_{n-1} y_{n-1} \quad (n>0) \quad (6)$$

where $er_{n-1} = (v_{n-1} - z_{n-1}) = (v_{n-1} - (\alpha_{n-1} x_{n-1} + \beta_{n-1} y_{n-1}))$ is an error value between the baseband signal of the ideal case and the calculated corrected signal. The multiplication factor $\gamma$ is an adjustable parameter determined experimentally to control the convergence of the SG method. The operation of the algorithm of equation (6) may be similar to the operation of a linear adaptive, one-tap, complex equalizer. For the ideal channel case, the coefficients $\alpha_n$ and $\beta_n$ computed from equation (6) converge to $\alpha=1, \beta=0$ for all n.

Figure 6:
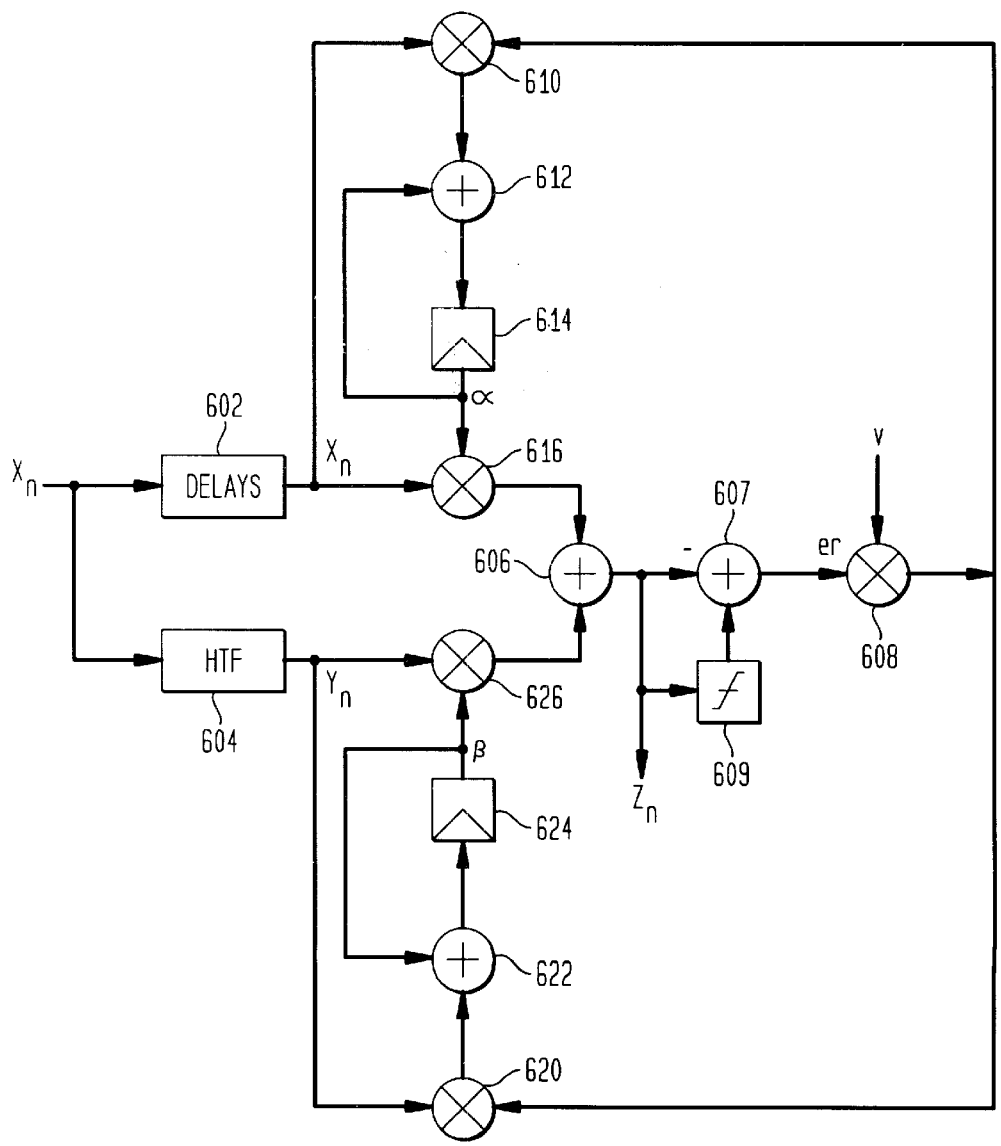
FIG. 6 shows a schematic diagram of an exemplary implementation of FIG. 2.

FIG. 6 shows a schematic diagram of an exemplary implementation of the phase tracker 104 of FIG. 1 in accordance with the present invention employing the SG method. The phase splitter 202 (FIG. 2) is implemented with Hilbert transform filter (HTF) 604 which generates $y_n$ from $x_n$, and a delay 602 that delays the value of $x_n$ to account for the latency of the HTF 604. Multiplier 616 multiplies the values $\alpha$ and $x_n$ to generate $\alpha x_n$, and multiplier 626 multiplies the values $\beta$ and $y_n$ to generate $\beta y_n$. The value for $z_n$ is then generated by combining $\alpha x_n$ and $\beta y_n$ in adder 606.

The values for coefficients $\alpha_n$ and $\beta_n$ are generated from the previous values of $x_{n-1}, y_{n-1}, \alpha_{n-1}$ and $\beta_{n-1}$ in accordance with equation (6). First, the error value $er_{n-1}$ is generated and multiplied by $\gamma$ in multiplier 608 to provide $\gamma er_{n-1}$. The error value $er_{n-1}$ may be generated by forming an estimated value of the ideal channel (or baseband) signal $v_{n-1}$ from the computed value for $z_{n-1}$ in limiter 609, inverting $z_{n-1}$, and forming the difference between the estimate of $v_{n-1}$ and $z_{n-1}$ in adder 607. The value $\gamma er_{n-1}$ is then multiplied by $x_{n-1}$ and $y_{n-1}$ in multipliers 610 and 620, respectively, to generate $\gamma er_{n-1} x_{n-1}$ and $\gamma er_{n-1} y_{n-1}$. The value for $\alpha_n$ is generated by adding, in adder 612, the value for $\gamma er_{n-1} x_{n-1}$ from multiplier 610 and the previous value $\alpha_{n-1}$ stored in buffer 614. Similarly, the value for $\beta_n$ is generated by adding, in adder 622, the value for $\gamma er_{n-1} x_{n-1}$ from multiplier 620 and the previous value $\beta_{n-1}$ stored in buffer 624.

The multiplication factor $\gamma$ is desirably selected as an integer power of two so that the multiplication performed by multiplier 608 may be implemented as bit shifts of a register. The total operation count for the exemplary hardware implementation of FIG. 6 is, therefore, four multiplications and four additions.

Some advantages of employing the linear transformation in accordance with equation (1) to generate the corrected signal $z_n$ are as follows. The gain adjustment operation and the phase rotation operation are combined into one step; a sine/cosine lookup table is not required; and including both a phase rotation and a gain adjustment may provide for increased performance of the demodulator. In addition, these advantages may result in reduced circuit complexity and reduced added error (e.g., from quantization effects or rounding error).

While the exemplary embodiments of the present invention have been described with respect to processes of circuits, the present invention is not so limited. As would be apparent to one skilled in the art, various functions of circuit elements may also be implemented in the digital domain as processing steps in a software program. Such software may be employed in, for example, a digital signal processor, micro-controller or general-purpose computer.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. Apparatus for phase tracking of a signal component to provide a corrected signal, the apparatus comprising:

a transform circuit adapted to apply a linear transform to the signal component and a quadrature component to form the corrected signal, wherein the linear transform is defined by a set of coefficients and the quadrature component is derived from the signal component; and a coefficient generator adapted to generate the set of coefficients based on a previous set of coefficients and a previous corrected signal, wherein the coefficient generator iteratively generates the set of coefficients in accordance with a stochastic gradient method.

2. The apparatus as recited in claim 1, further comprising a phase splitter, wherein the phase splitter generates the quadrature component from the signal component.

3. The apparatus as recited in claim 2, wherein the phase splitter is a Hilbert-transform filter adapted to generate the quadrature component as the signal component shifted, in phase, by about 90°.

4. The apparatus as recited in claim 2, further comprising a delay adapted to provide the signal component when the phase splitter generates the quadrature component.

5. The apparatus as recited in claim 1, wherein the transform circuit employs the set of coefficients $\alpha_n$ and $\beta_n$ to provide the corrected signal $z_n$ as a linear transform of the signal component $x_n$ and the quadrature component $y_n$, n an integer, the linear transform defined as:

$$z_n = \alpha x_n + \beta y_n.$$

6. The apparatus as recited in claim 5, wherein the set of coefficients is derived in accordance with an optimization criterion based on the corrected signal $z_n$ and an ideal channel signal $v_n$.

7. The apparatus as recited in claim 5, wherein the signal component $x_n$ is related to an ideal channel signal $v_n$ representing one of a set of code symbols, and the set of coefficients is an optimal set derived so as to minimize mean square error between the corrected signal $z_n$ and the ideal channel signal $v_n$.

8. The apparatus as recited in claim 7, wherein the coefficient generator iteratively generates the set of coefficients $\alpha_n$ and $\beta_n$ in accordance with the stochastic gradient method defined as:

$$\alpha_{(n=0)} = 1, \beta_{(n=0)} = 0,$$
$$\alpha_n = \alpha_{n-1} + \gamma er_{n-1} x_{n-1}, (n>0)$$

and $$\beta n + \beta_{n-1} + \gamma er_{n-1} y_{n-1} \ (n>0)$$

wherein $er_{n-1}$ is an error signal defined as $(v_{n-1} - z_{n-1})$ and $\gamma$ is a multiplication factor.

9. The apparatus as recited in claim 7, wherein the ideal channel signal $v_n$ is a vestigial sideband signal representing one of a set of code symbols of a trellis code.

10. The apparatus as recited in claim 1, wherein the signal component is derived from a high definition television (HDTV) signal, and the apparatus is a HDTV receiver.

11. The apparatus as recited in claim 1, wherein the signal component is derived from a radio signal, and the apparatus is a radio receiver.

12. A method of phase tracking of a signal component to provide a corrected signal comprising the steps of:

a) applying a linear transform defined by a set of coefficients to the signal component and a quadrature component to form the corrected signal, wherein the linear transform is defined by a set of coefficients and the quadrature component is derived from the signal component;

b) iteratively generating the set of coefficients in accordance with a stochastic gradient method based on a previously generated set of coefficients and a previous corrected signal.

13. The method as recited in claim 12, further comprising the step of generating the quadrature component with a phase splitter.

14. The method as recited in claim 13, wherein, for the step of generating the quadrature component, the phase splitter is a Hilbert-transform filter adapted to shift, in-phase, the signal component by about 90°.

15. The method as recited in claim 13, further comprising the step of delaying the signal component to provide the signal component when the quadrature component is generated.

16. The method as recited in claim 12, wherein step a) applies the set of coefficients $\alpha_n$ and $\beta_n$ to provide the corrected signal $z_n$ to form a linear transform of the signal component $x_n$ and the quadrature component $y_n$, n an integer, the linear transform defined as:

$$z_n = \alpha x_n + \beta y_n.$$

17. The method as recited in claim 16, step b) generates the set of coefficients derived in accordance with an optimization criterion based on the corrected signal $z_n$ and an ideal channel signal $v_n$.

18. The method as recited in claim 16, wherein the signal component $x_n$ is related to an ideal channel signal $v_n$ representing one of a set of code symbols, and step b) generates the set of coefficients as an optimal set with respect to minimum mean square error between the corrected signal $z_n$ and the ideal channel signal $v_n$.

19. The method as recited in claim 18, wherein step b) iteratively generates the set of coefficients $\alpha_n$ and $\beta_n$ in accordance with the stochastic gradient method defined as:

$$\alpha_{(n=0)}=1, \beta_{(n=0)}=0,$$

$$\alpha_n = \alpha_{n-1} \gamma er_{n-1} x_{n-1}, (n>0)$$

and $$\beta_n = \beta_{n-1} \gamma er_{n-1} y_{n-1} \ (n>0)$$

wherein $er_{n-1}$ is an error signal defined as $(v_{n-1}-z_{n-1})$ and $\gamma$ is a multiplication factor.

20. The method as recited in claim 18, wherein, for step b), the ideal channel signal $v_n$ is a vestigial sideband signal representing one of a set of code symbols of a trellis code.

21. An integrated circuit having a phase tracking circuit for phase tracking of a signal component to provide a corrected signal, the integrated circuit comprising:

a phase splitter adapted to provide a quadrature component from the signal component;

a transform circuit adapted to apply a linear transform defined by a set of coefficients to the signal component and the quadrature component to form the corrected signal; and a coefficient generator adapted to generate the set of coefficients based on a previous set of coefficients and a previous corrected signal wherein the coefficient generator iteratively generates the set of coefficients in accordance with a stochastic gradient method.

22. A computer-readable medium having stored thereon a plurality of instructions, the plurality of instructions including instructions which, when executed by a processor, cause the processor to implement a method for phase tracking of a signal component to provide a corrected signal, the method comprising the steps of:

a) generating a quadrature component from the signal component;

b) applying a linear transform defined by a set of coefficients to the signal component and the quadrature component to form the corrected signal;

c) iteratively generating the set of coefficients in accordance with a stochastic gradient method based on a previously generated set of coefficients and a previous corrected signal.

* * * * *